United States Patent
Hirashita et al.

(10) Patent No.: US 8,573,349 B2
(45) Date of Patent: Nov. 5, 2013

(54) FORKLIFT

(75) Inventors: Toshiyuki Hirashita, Hiratsuka (JP);
Shinichi Naito, Komatsu (JP); Tsutomu Komatsu, Hasuda (JP); Yuuichi Fukata, Oyama (JP); Hitoshi Miyamoto, Yuuki (JP); Kaoru Hasegawa, Yuuki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/637,797

(22) PCT Filed: Jul. 21, 2011

(86) PCT No.: PCT/JP2011/066570
§ 371 (c)(1),
(2), (4) Date: Feb. 25, 2013

(87) PCT Pub. No.: WO2012/029429
PCT Pub. Date: Mar. 8, 2012

(65) Prior Publication Data
US 2013/0146384 A1 Jun. 13, 2013

(30) Foreign Application Priority Data

Aug. 31, 2010 (JP) ................................ 2010-194759

(51) Int. Cl.
*B60K 17/356* (2006.01)
(52) U.S. Cl.
USPC ......................................... 180/305; 180/307
(58) Field of Classification Search
USPC .................... 180/305, 306, 307, 308
See application file for complete search history.

(56) References Cited

U.S. PATENT DOCUMENTS

| 5,190,435 A | * | 3/1993 | Epstein .......................... 414/635 |
| 5,473,964 A | * | 12/1995 | Okada et al. ................. 74/606 R |
| 6,129,169 A | * | 10/2000 | Skirde ............................. 180/305 |
| 6,175,796 B1 | * | 1/2001 | Ishikawa .......................... 701/50 |

(Continued)

FOREIGN PATENT DOCUMENTS

| CN | 101137524 A | 3/2008 |
| DE | 43 25 211 A1 | 2/1995 |

(Continued)

OTHER PUBLICATIONS

International Search Report dated Oct. 18, 2011, issued for PCT/JP2011/066570.

(Continued)

*Primary Examiner* — Jeffrey J Restifo
(74) *Attorney, Agent, or Firm* — Edwards Wildman Palmer LLP

(57) ABSTRACT

In order to decrease the number of handling components of a parking brake unit without increasing a length of a wheel base, there is provided a forklift including a main input shaft which is rotationally driven by a hydraulic motor, a differential input shaft which rotates by the rotation of the main input shaft, and a differential mechanism which is provided between the differential input shaft and a front axle, the forklift being configured to run by transmitting power of the hydraulic motor to the front axle through the main input shaft, the differential input shaft, and the differential mechanism, wherein an idle shaft is disposed so as to be parallel to the differential input shaft, a power transmission mechanism obtained by meshing gears and is interposed between the differential input shaft and the idle shaft, and then a parking brake unit is provided in the idle shaft.

5 Claims, 6 Drawing Sheets

(56) References Cited

U.S. PATENT DOCUMENTS

| | | | |
|---|---|---|---|
| 6,293,022 B1* | 9/2001 | Chino et al. | 33/203.18 |
| 6,554,084 B1* | 4/2003 | Enmeiji | 180/6.24 |
| 7,044,258 B2* | 5/2006 | Lamela et al. | 180/305 |
| 7,237,643 B2* | 7/2007 | Ohashi et al. | 180/307 |
| 7,387,185 B2* | 6/2008 | Abend et al. | 180/306 |
| 7,419,025 B2* | 9/2008 | Ishii et al. | 180/242 |
| 7,422,077 B2* | 9/2008 | Ishimaru et al. | 180/53.4 |
| 7,524,268 B2* | 4/2009 | Oka et al. | 477/169 |
| 7,568,547 B2* | 8/2009 | Yamada et al. | 180/306 |
| 7,610,985 B2* | 11/2009 | Ohashi | 180/305 |
| 7,610,986 B2* | 11/2009 | Ohashi | 180/305 |
| 7,762,371 B2* | 7/2010 | Kawamura et al. | 180/305 |
| 8,056,670 B2* | 11/2011 | Ohashi et al. | 180/307 |
| 8,100,204 B2* | 1/2012 | Dong et al. | 180/6.48 |
| 8,181,731 B2* | 5/2012 | Bessho et al. | 180/305 |
| 2003/0075376 A1* | 4/2003 | Steele | 180/307 |
| 2008/0271564 A1 | 11/2008 | Uezono et al. | |
| 2013/0146384 A1* | 6/2013 | Hirashita et al. | 180/307 |

FOREIGN PATENT DOCUMENTS

| | | |
|---|---|---|
| DE | 10 2008 034 242 A1 | 1/2010 |
| JP | 59-145455 U | 9/1984 |
| JP | 05-215200 A | 8/1993 |
| JP | 10-147220 A | 6/1998 |
| JP | 2005/054888 A | 3/2005 |
| WO | WO-2006/095813 A1 | 9/2006 |

OTHER PUBLICATIONS

Office Action dated Feb. 16, 2013, issued for the corresponding German patent application No. 11 2011 100 878.3 and English translation thereof.

\* cited by examiner

FORKLIFT

FIELD

The present invention relates to a forklift, and particularly, to an arrangement position of a parking brake unit.

BACKGROUND

As a parking brake unit of a forklift, there is a parking brake unit provided in a power train provided between a transmission and a differential mechanism (for example, see Patent Literature 1). It is desirable that the parking brake unit brakes a plurality of wheels, but a parking brake unit provided for each wheel is disadvantageous from the viewpoint of the assembling operation or the manufacture cost. In contrast, as described above, when the parking brake unit is provided in the power train reaching the differential mechanism, the plurality of wheels may be braked even by a single parking brake unit. Accordingly, compared to the case where each wheel is provided with the parking brake unit, the number of handling components may be decreased, and hence the manufacture operation may be facilitated or the manufacture cost may be decreased.

CITATION LIST

Patent Literature

Patent Literature 1: Japanese Patent Application Laid-open No. 10-147220

SUMMARY

Technical Problem

However, in the above-described forklift, compared to the case where the parking brake unit is provided in each wheel, the entire length of the power train increases. Accordingly, for example, an increase in the length of the wheel base may be caused. An increase in the length of the wheel base causes an increase in turning radius, and hence this is not desirable in consideration of the performance of the forklift.

The invention is made in view of the above-described circumstances, and it is an object to provide a forklift capable of decreasing the number of handling components of a parking brake unit without increasing a length of a wheel base.

Solution to Problem

In order to attain the above-described object, according to the invention, there is provided a forklift including: a hydraulic pump that is mounted on a vehicle body in a state where a pump input shaft follows a longitudinal direction of the vehicle body and a front end of the pump input shaft faces a rear side of the vehicle body; a hydraulic motor that is mounted on the vehicle body in a state where a motor output shaft follows the longitudinal direction of the vehicle body and a front end of the motor output shaft faces a front side of the vehicle body, the hydraulic motor being driven by oil supplied from the hydraulic pump; a first input shaft which is rotationally driven by the hydraulic motor, the first input shaft being disposed so as to be concentric with the motor output shaft of the hydraulic motor; a second input shaft which rotates by the rotation of the first input shaft; and a differential mechanism which is provided between the second input shaft and an axle that is disposed along to a horizontal direction of the vehicle body, wherein the forklift is configured to run by transmitting power of the hydraulic motor to the axle through the first input shaft, the second input shaft, and the differential mechanism, the motor output shaft of the hydraulic motor is disposed so as to be offset to a left lower side of the vehicle body with respect to the pump input shaft, the second input shaft is disposed so as to be parallel to the first input shaft, an idle shaft is disposed so as to be parallel to the second input shaft at a position below the pump input shaft of the hydraulic pump and so as to be offset to the first input shaft and second input shaft, respectively, a power transmission mechanism obtained by meshing gears is interposed between the second input shaft and the idle shaft, and then a parking brake unit is provided in the idle shaft.

Further, according to the above-described forklift of the invention, in the power transmission mechanism, a transfer gear is provided in the second input shaft, an idle input gear with a friction gear mechanism is provided in the idle shaft, and the idle input gear meshes with the transfer gear.

Further, according to the above-described forklift of the invention, the power transmission mechanism transmits the rotation of the second input shaft to the idle shaft by increasing the speed thereof.

Further, according to the above-described forklift of the invention, an input gear is provided in the first input shaft and the input gear meshes with the transfer gear.

Further, according to the above-described forklift of the invention, the idle shaft is disposed at a position equal to or lower than the height of the second input shaft.

Advantageous Effects of Invention

According to the invention, since the parking brake unit is provided so as to act on the power train reaching the differential mechanism, the plurality of wheels may be braked even by a single parking brake unit, and hence the number of handling components may be decreased. Further, the idle shaft provided with the parking brake unit does not influence the entire length of the power train. Accordingly, the installation of the parking brake unit does not cause an increase in the length of the wheel base.

DESCRIPTION OF EMBODIMENTS

Hereinafter, an exemplary embodiment of a forklift according to the invention will be described in detail by referring to the accompanying drawings.

Figure 1:
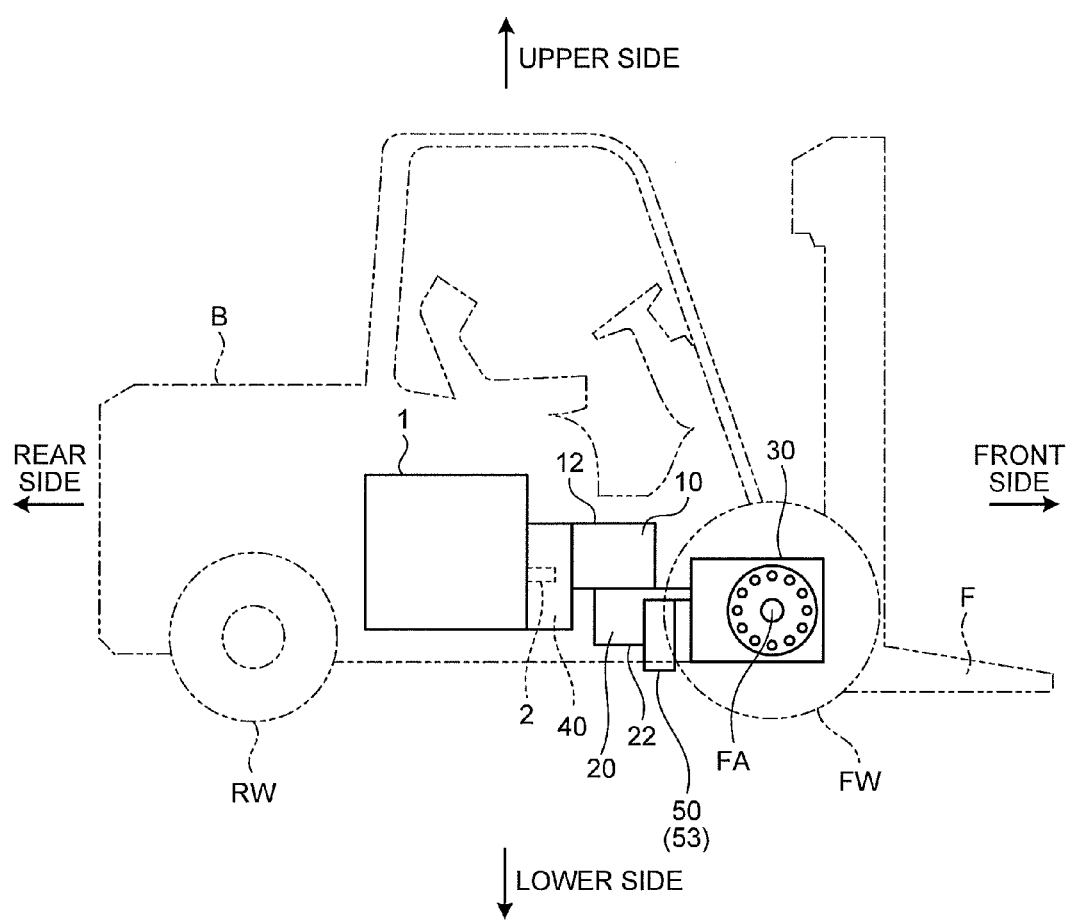
FIG. 1 is a side view conceptually illustrating a forklift as an example of the invention.
Figure 2:
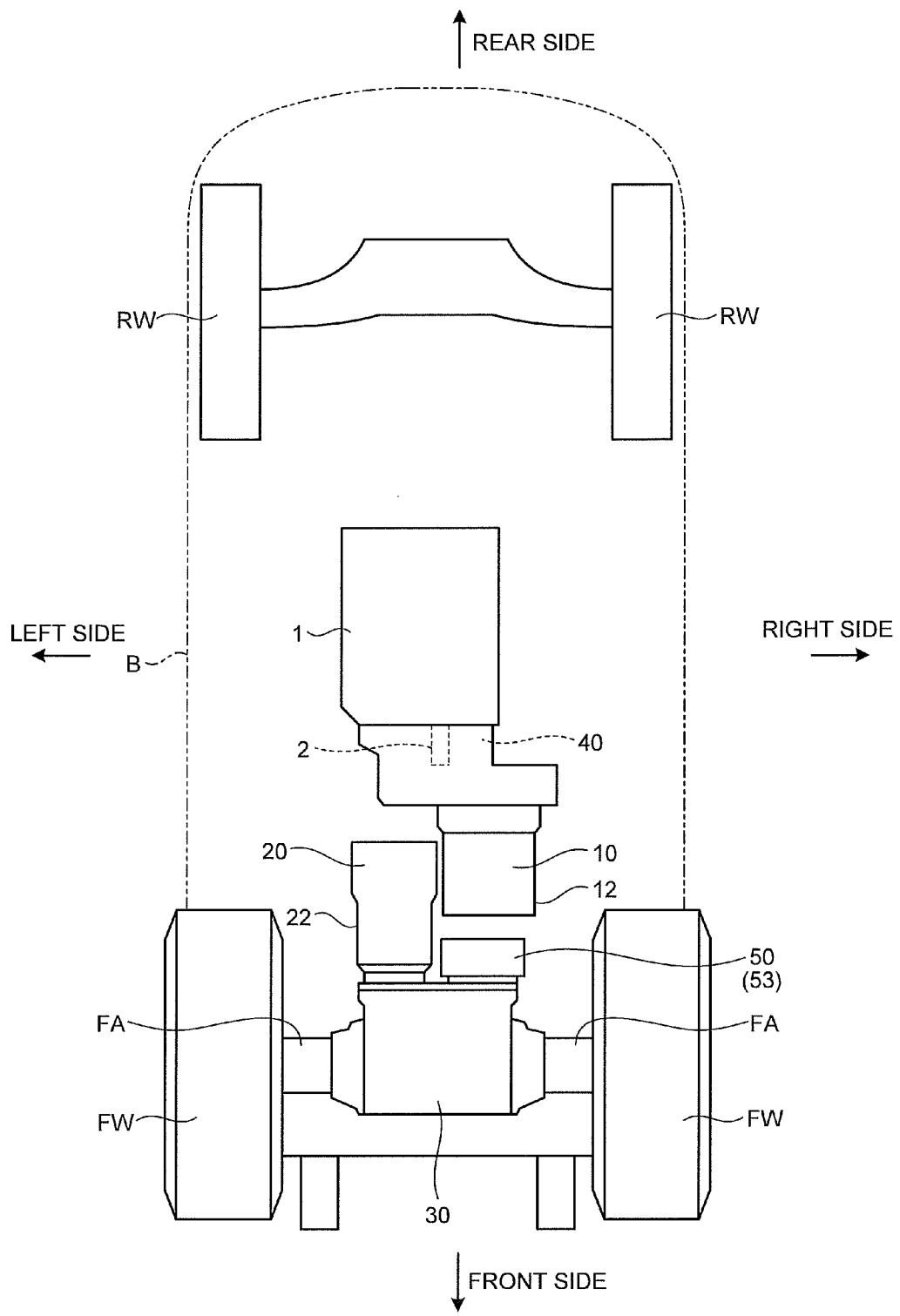
FIG. 2 is a bottom view of the forklift illustrated in FIG. 1.
Figure 3:
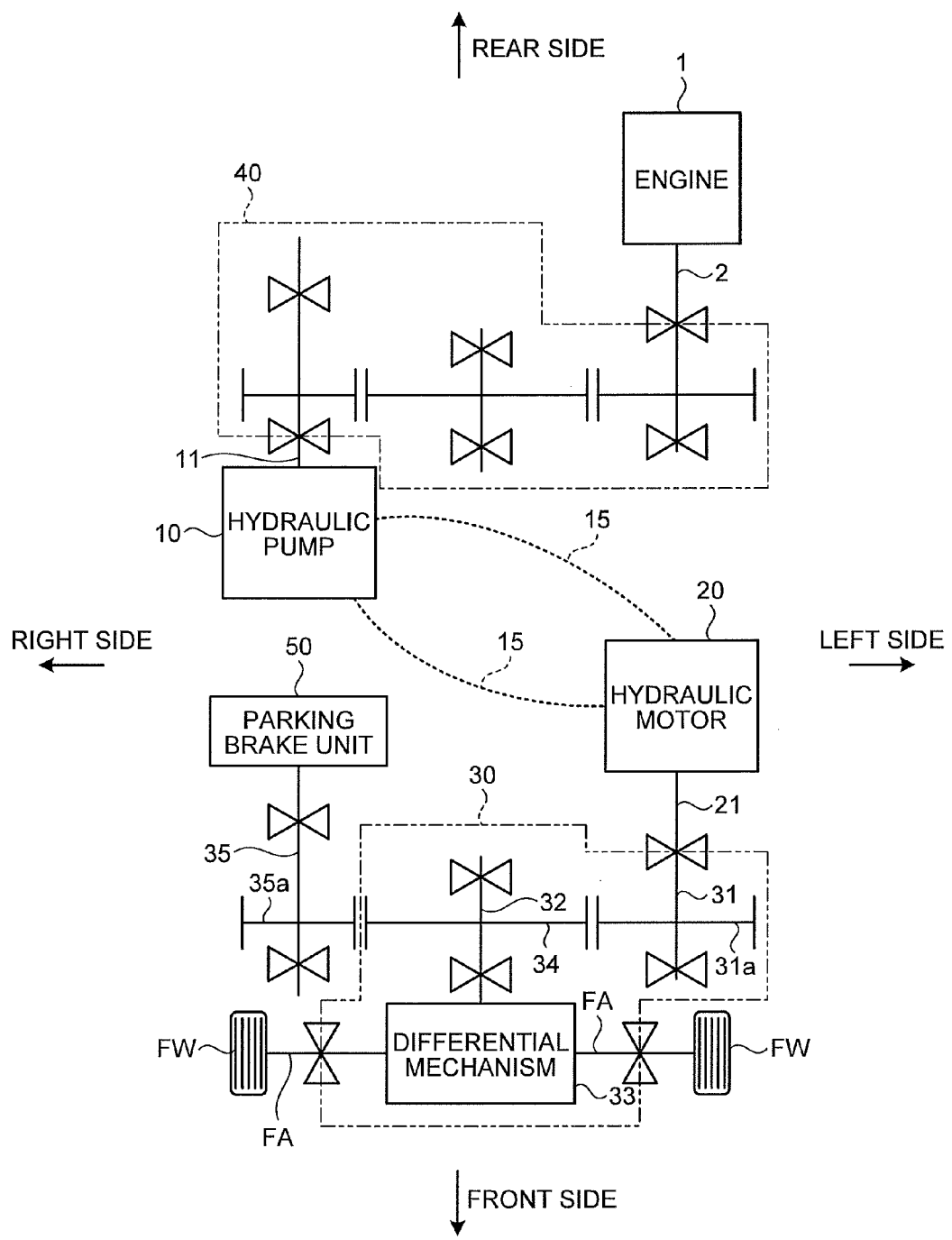
FIG. 3 is a skeleton diagram illustrating a power train from an engine of the forklift illustrated in FIG. 1 to a wheel.
Figure 4:
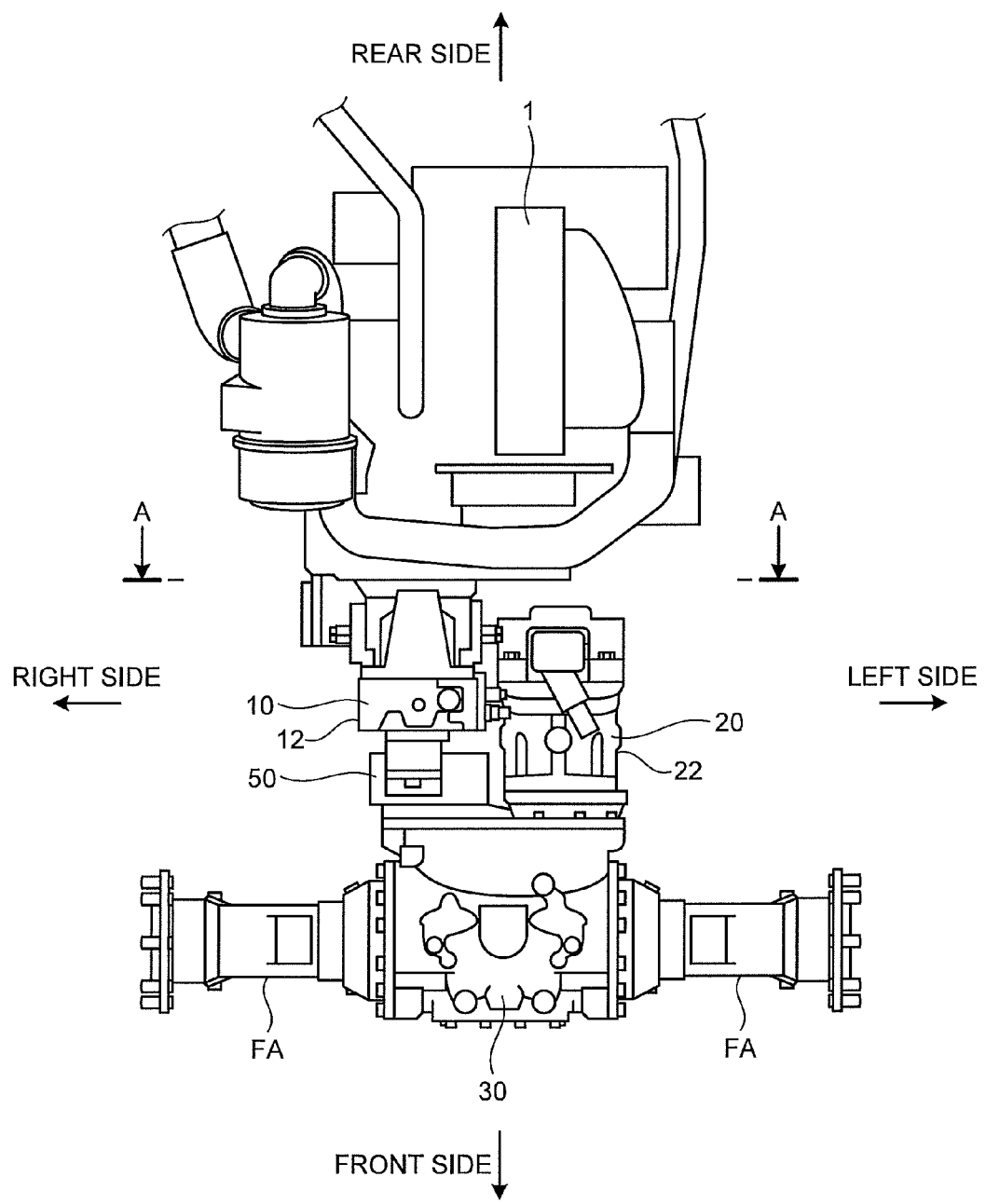
FIG. 4 is a plan view conceptually illustrating a component from the engine of the forklift illustrated in FIG. 1 to an axle.

FIGS. 1 and 2 are diagrams illustrating a forklift as an example of the invention. The forklift which is exemplified herein runs by using front wheels FW as driving wheels and using rear wheels RW as steering wheels, and puts a baggage up and down or conveys the baggage by a fork F installed at the front side of a vehicle body B. The forklift includes an engine 1 which is provided at the substantially center position of the vehicle body B, and includes a hydraulic pump 10, a hydraulic motor 20, and a transfer device 30 between the engine 1 and front axles FA. The engine 1 is an internal combustion engine which is driven by combusting fuel such as gasoline. As illustrated in FIGS. 2 to 4, the engine is mounted on the vehicle body B in a state where an engine output shaft 2 follows the longitudinal direction of the vehicle body B and the front end of the engine output shaft 2 faces the front side of the vehicle body B at the substantial center in the transverse direction of the vehicle body B.

Figure 5:
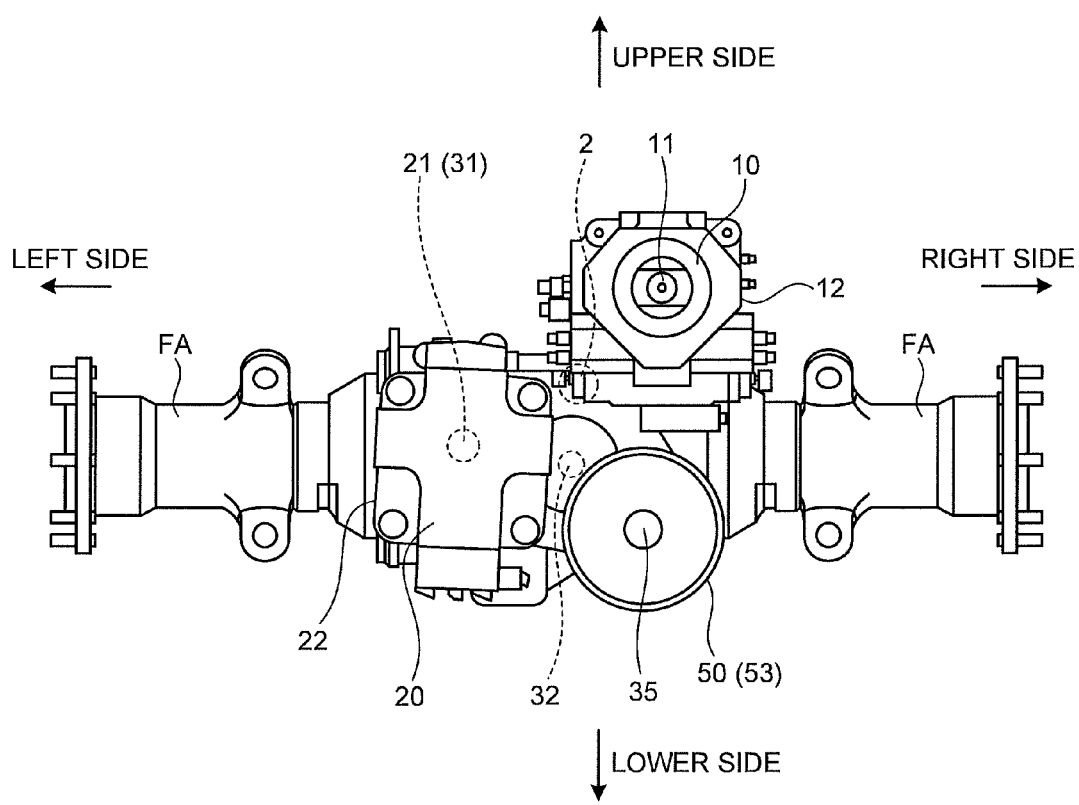
FIG. 5 is a cross-sectional view taken along the line A-A of FIG. 4.

The hydraulic pump 10 is of a variable displacement type, and as illustrated in FIG. 3, the hydraulic pump is mounted on the vehicle body B in a state where a pump input shaft 11 follows the longitudinal direction of the vehicle body B and the front end of the pump input shaft 11 faces the rear side of the vehicle body B. The pump input shaft 11 of the hydraulic pump 10 is disposed so as to be offset to the right upper side of the vehicle body B with respect to the engine output shaft 2 as illustrated in FIG. 5. In the hydraulic pump 10, as illustrated in FIGS. 2 to 4, the pump input shaft 11 and the engine output shaft 2 are connected to each other through a speed reduction mechanism 40, and the pump operation is performed when the engine 1 is driven.

The hydraulic motor 20 is of a variable displacement type, and as illustrated in FIG. 3, the hydraulic motor is mounted on the vehicle body B in a state where a motor output shaft 21 follows the longitudinal direction of the vehicle body B and the front end of the motor output shaft 21 faces the front side of the vehicle body B. As illustrated in FIG. 5, the motor output shaft 21 of the hydraulic motor 20 is disposed so as to be offset to the left lower side of the vehicle body B with respect to the pump input shaft 11 without causing a motor casing 22 of the hydraulic motor 20 to contact a pump casing 12 of the hydraulic pump 10. As illustrated in FIG. 3, the hydraulic motor 20 is connected to the hydraulic pump 10 by a hydraulic closed circuit 15, forms a hydraulic transmission mechanism called an HST (Hydro-Static Transmission), and is driven by oil supplied from the hydraulic pump 10.

As illustrated in FIG. 3, the transfer device 30 receives power from the motor output shaft 21 of the hydraulic motor 20 and distributes the power output from the motor output shaft 21 to the left and right front axles FA, and the transfer device includes a main input shaft (a first input shaft) 31, a differential input shaft (a second input shaft) 32, and a differential mechanism 33.

Figure 6:
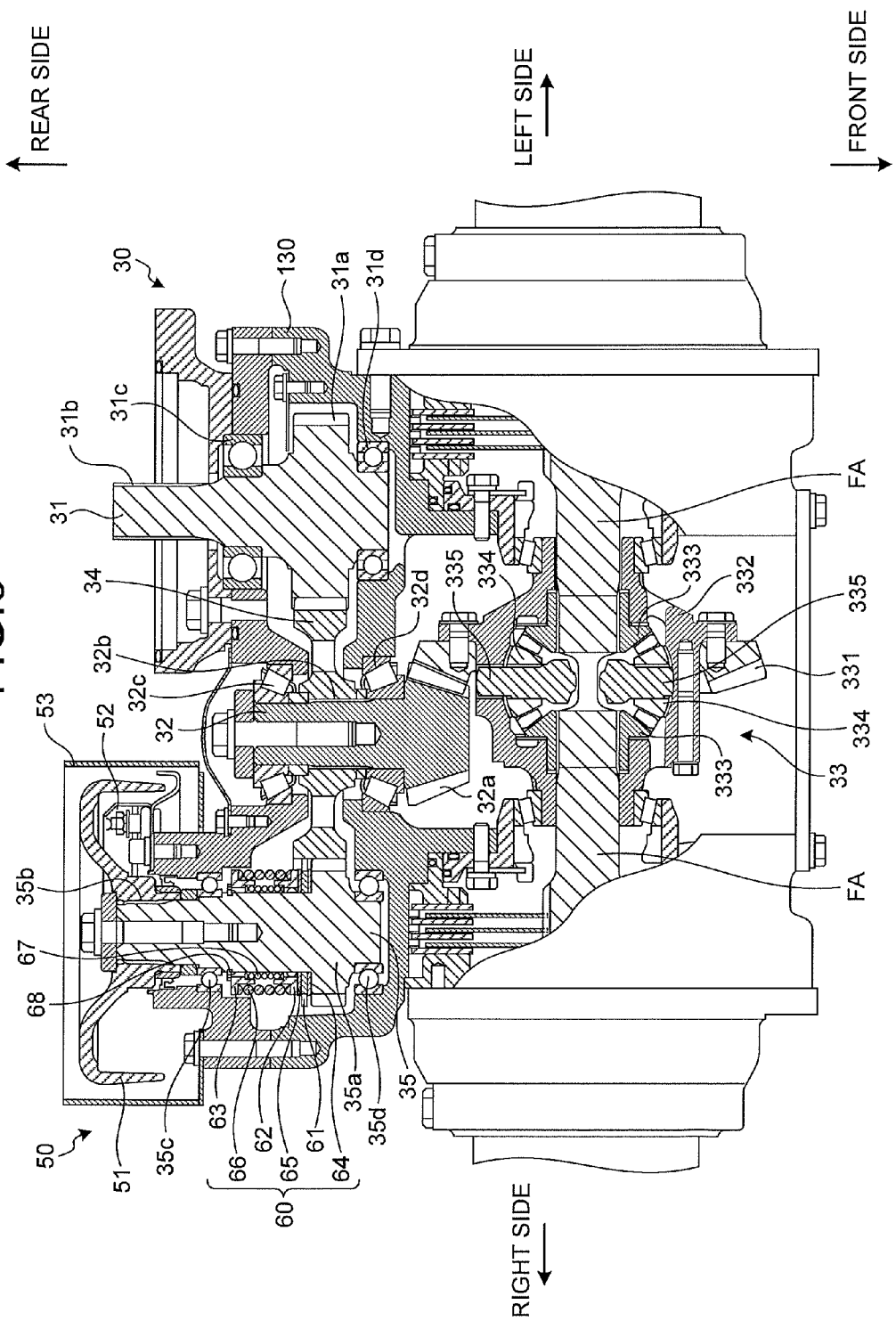
FIG. 6 is a partially cutaway plan view illustrating a transfer device which is applied to the forklift illustrated in FIG. 1.

As illustrated in FIG. 6, the main input shaft 31 includes a main input gear (an input gear) 31a provided in the base end thereof and a spline 31b provided in the outer periphery of the front end thereof, and is rotatably supported to a transfer casing 130 through ball bearings 31c and 31d. The main input gear 31a is a tooth gear, and is integrally formed with the main input shaft 31. The main input shaft 31 is spline-coupled to the motor output shaft 21 through the spline 31b of the front end in a state where the front end thereof faces the rear side of the vehicle body B, and is disposed so as to be concentric with the motor output shaft 21.

The differential input shaft 32 includes a differential input gear 32a which is provided at the base end thereof and a spline 32b which is provided in the middle outer periphery thereof, and is rotatably supported to the transfer casing 130 through tapered roller bearings 32c and 32d. The differential input gear 32a is a bevel gear, and is integrally formed with the differential input shaft 32. The differential input shaft 32 is disposed so as to be offset to the right side of the vehicle body B in a state where the base end thereof faces the front side of the vehicle body B and the axis thereof is disposed at the substantially same height as that of the main input shaft 31 (see FIG. 5). A transfer gear 34 is disposed in the spline 32b of the differential input shaft 32. The transfer gear 34 is a tooth gear which is spline-coupled to the differential input shaft 32 and meshes with the main input gear 31a of the main input shaft 31, and rotates the differential input shaft 32 at a reduced speed when the main input shaft 31 rotates.

A ring gear 331 of the differential mechanism 33 meshes with the differential input gear 32a of the differential input shaft 32. As in the existing differential mechanism, the differential mechanism 33 includes a carrier 332, two side gears 333, and a plurality of pinion gears 334, and transmits the rotation of the differential input gear 32a to the front axles FA through the carrier 332, the pinion gear 334, and each side gear 333. The carrier 332 is disposed so as to be rotatable about the axis of the front axle FA, and is connected to the ring gear 331. The side gear 333 is bevel gear which is connected to each front axle FA and is disposed so as to face the carrier 332 therein. The pinion gear 334 is bevel gear which is disposed in the carrier 332 through a pinion shaft 335 so as to revolve about the axis of the front axle FA and to rotate about its axis, and meshes with each of two facing side gears 333.

On the other hand, in the forklift, an idle shaft 35 is provided in the transfer casing 130 so as to be parallel to the differential input shaft 32. The idle shaft 35 includes an idle input gear 35a provided in the base end thereof and a spline 35b provided in the outer periphery of the front end thereof, and is rotatably supported to the transfer casing 130 through ball bearings 35c and 35d. The idle input gear 35a is a tooth gear which meshes with the differential input gear 32a of the differential input shaft 32 and inputs the rotation of the differential input shaft 32 to the idle shaft 35 by increasing the speed thereof, and is integrally formed with the idle shaft 35. As illustrated in FIG. 5, the idle shaft 35 is offset to the right lower side of the vehicle body B with respect to the differential input shaft 32 in a state where the front end faces the rear side of the vehicle body B in the longitudinal direction of the vehicle body B, and is almost disposed directly below the hydraulic pump 10.

The idle shaft 35 is provided with a parking brake unit 50 and a friction gear mechanism 60. The parking brake unit 50 is of a drum type including a drum 51 which is spline-coupled to the spline 35b of the idle shaft 35, a brake shoe 52 which is attached to the transfer casing 130 and is movable close to or away from the inner peripheral surface of the drum 51, and a brake spring (not illustrated) which presses the brake shoe 52 toward the inner peripheral surface of the drum 51. The outer peripheral portion of the drum 51 is provided with a dust cover 53. The dust cover 53 largely protrudes toward the rear side of the vehicle body B with respect to the transfer casing 130. However, as described above, the idle shaft 35 is offset to the right lower side of the vehicle body B with respect to the differential input shaft 32. For this reason, the idle shaft does not contact the motor casing 22 of the hydraulic motor 20 or the pump casing 12 of the hydraulic pump 10.

In the parking brake unit 50, the brake shoe 52 is firmly pressed against the inner peripheral surface of the drum 51 by a pressure of a brake spring (not illustrated) in a normal state, whereby the rotation of the idle shaft 35 with respect to the transfer casing 130 is inhibited. Here, when a releasing operation is performed, the parking brake unit 50 is released, and the brake shoe 52 moves away from the drum 51 against the pressure of the brake spring (not illustrated). As a result, the idle shaft 35 is rotatable along with the drum 51 with respect to the transfer casing 130.

The friction gear mechanism 60 is used to remove a backlash between the transfer gear 34 of the differential input shaft 32 and the idle input gear 35a of the idle shaft 35, and includes a sub-input gear 61 and a pair of pressure rings 62 and 63. The sub-input gear 61 is a thin plate-like gear which is disposed so as to be rotatable about the idle shaft 35 and meshes with the transfer gear 34. The sub-input gear 61 is a shift gear of which the number of teeth is different from that of the idle input gear 35a and for example, the number of teeth is larger by one than that of the idle input gear 35a, and both end surfaces are provided with friction plates 64 and 65. The pair of pressure rings 62 and 63 is an annular member having an inner diameter larger than the outer diameter of the shaft portion of the idle shaft 35. The pressure rings 62 and 63 are disposed between the sub-input gear 61 and a C-ring 68 fitted to the outer periphery of the idle shaft 35, with pressure springs 66 and 67 interposed therebetween. The pressure springs 66 and 67 are used to press the sub-input gear 61 against the end surface of the idle input gear 35a with one of the pressure rings 62 and 63 interposed therebetween.

In the forklift with the above-described configuration, when the engine 1 is operated, the hydraulic pump 10 is driven through the speed reduction mechanism 40, and oil is supplied from the hydraulic pump 10 to the hydraulic motor 20.

In a case where the parking brake unit 50 is released, the hydraulic motor 20 to which oil is supplied from the hydraulic pump 10 rotates. The rotation of the motor output shaft 21 is transmitted to the carrier 332 of the differential mechanism 33 through the main input shaft 31, the main input gear 31a, the transfer gear 34, and the differential input gear 32a, and further the rotation is distributed to two front axles FA through the pinion gear 334 and the side gear 333. Accordingly, for example, the forklift moves forward. When the hydraulic motor 20 rotates in the reverse direction, the front axle FA also rotates in the reverse direction, and hence the forklift moves backward.

In the meantime, the idle shaft 35 which constitutes the parking brake unit 50 is also rotatable with respect to the transfer casing 130, but since no load is applied thereto, there is a concern that rattling noise may be generated when a change in the rotation of the differential input shaft 32 occurs. However, in the forklift, the idle input gear 35a meshes with the transfer gear 34 without any backlash by the action of the sub-input gear 61 which comes into press-contact with the idle input gear 35a through the friction plates 64 and 65. That is, the sub-input gear 61 of which the number of teeth is larger than that of the idle input gear 35a rotates slowly with respect to the idle input gear 35a and acts so as to nip the transfer gear 34 between the sub-input gear and the idle input gear 35a. Accordingly, the idle input gear 35a meshes with the transfer gear 34 without any backlash. Accordingly, even in a case where a change in the rotation of the differential input shaft 32 occurs, it is possible to follow the rotation of the differential input shaft 32 without generating the rattling noise.

On the other hand, in a case where the rotation of the idle shaft 35 with respect to the transfer casing 130 is inhibited in the normal state of the parking brake unit 50, all of the differential input shaft 32 meshing with the idle input gear 35a through the transfer gear 34 and the main input shaft 31 meshing with the transfer gear 34 through the main input gear 31a may not rotate with respect to the transfer casing 130. Accordingly, since the carrier 332 which is connected to the differential input shaft 32 through the differential input gear 32a and the ring gear 331 does not rotate with respect to the transfer casing 130 and two front axles FA may not rotate in the same direction, the forklift is maintained in a parking state.

Here, according to the forklift, the transfer gear 34 and the idle input gear 35a are configured to increase and transmit the rotation of the differential input shaft 32 to the idle shaft 35. Accordingly, in the parking brake unit 50, it is possible to further reliably maintain a state where the rotation of the differential input shaft 32 is inhibited by a small braking torque and to decrease the size of the drum 51 while the braking force is sufficiently ensured.

Further, the same function as that of the state where two front wheels FW are both braked may be accomplished as a result even by the single parking brake unit 50, and hence the braking function in the parking operation may be ensured without increasing the number of the handling components.

Further, the idle shaft 35 which constitutes the parking brake unit 50 is installed in parallel to the differential input shaft 32 of the power train from the hydraulic motor 20 to the differential mechanism 33, and does not influence the entire length of the power train. Accordingly, for example, compared to a case where the main input shaft 31 is provided with the parking brake unit 50, the hydraulic motor 20, the hydraulic pump 10, and the engine 1 may be respectively disposed so as to be close to the front axle FA, and the installation of the parking brake unit 50 does not cause an increase in length of the wheel base.

Furthermore, in the above-described example, the forklift is exemplified which runs in a state where the front wheel FW is used as the driving wheel and the rear wheel RW is used as the steering wheel, but the driving type is not limited thereto. Further, the forklift having HST is exemplified, but the invention is not necessarily limited to the forklift having HST, and may be applied to a forklift having a transmission with a plurality of gear sets. Furthermore, as the parking brake unit 50, a so-called drum type is exemplified, but the other braking devices may be applied.

Further, in the above-described example, since the idle shaft 35 is disposed at a position equal to or lower than the height of the differential input shaft 32, the maintenance of the parking brake unit 50 may be easily performed from the lower side of the vehicle body B, but the invention is not necessarily limited to the arrangement.

REFERENCE SIGNS LIST

20 HYDRAULIC MOTOR
30 TRANSFER DEVICE
31 MAIN INPUT SHAFT
31a MAIN INPUT GEAR
32 DIFFERENTIAL INPUT SHAFT
32a DIFFERENTIAL INPUT GEAR
33 DIFFERENTIAL MECHANISM
34 TRANSFER GEAR
35 IDLE SHAFT
35a IDLE INPUT GEAR
40 SPEED REDUCTION MECHANISM
50 PARKING BRAKE UNIT
60 FRICTION GEAR MECHANISM
61 SUB-INPUT GEAR
62, 63 PRESSURE RING
64, 65 FRICTION PLATE
66, 67 PRESSURE SPRING
130 TRANSFER CASING
331 RING GEAR
332 CARRIER
333 SIDE GEAR
334 PINION GEAR
335 PINION SHAFT
FA FRONT AXLE

The invention claimed is:

1. A forklift comprising:

a hydraulic pump that is mounted on a vehicle body in a state where a pump input shaft follows a longitudinal direction of the vehicle body and a front end of the pump input shaft faces a rear side of the vehicle body;

a hydraulic motor that is mounted on the vehicle body in a state where a motor output shaft follows the longitudinal direction of the vehicle body and a front end of the motor output shaft faces a front side of the vehicle body, the hydraulic motor being driven by oil supplied from the hydraulic pump;

a first input shaft which is rotationally driven by the hydraulic motor, the first input shaft being disposed so as to be concentric with the motor output shaft of the hydraulic motor;

a second input shaft which rotates by the rotation of the first input shaft; and a differential mechanism which is provided between the second input shaft and an axle that is disposed along to a horizontal direction of the vehicle body, wherein the forklift is configured to run by transmitting power of the hydraulic motor to the axle through the first input shaft, the second input shaft, and the differential mechanism, the motor output shaft of the hydraulic motor is disposed so as to be offset to a left lower side of the vehicle body with respect to the pump input shaft, the second input shaft is disposed so as to be parallel to the first input shaft, an idle shaft is disposed so as to be parallel to the second input shaft at a position below the pump input shaft of the hydraulic pump and so as to be offset to the first input shaft and second input shaft, respectively, a power transmission mechanism obtained by meshing gears is interposed between the second input shaft and the idle shaft, and then a parking brake unit is provided in the idle shaft.

2. The forklift according to claim 1, wherein in the power transmission mechanism, a transfer gear is provided in the second input shaft, an idle input gear with a friction gear mechanism is provided in the idle shaft, and the idle input gear meshes with the transfer gear.

3. The forklift according to claim 1, wherein the power transmission mechanism transmits the rotation of the second input shaft to the idle shaft by increasing the speed thereof.

4. The forklift according to claim 2, wherein an input gear is provided in the first input shaft and the input gear meshes with the transfer gear.

5. The forklift according to claim 1, wherein the idle shaft is disposed at a position equal to or lower than the height of the second input shaft.

* * * * *